(12) United States Patent
Freemantle et al.

(10) Patent No.: US 10,738,861 B2
(45) Date of Patent: Aug. 11, 2020

(54) CONTROL OF HYDRAULIC TENSIONER TUNING USING HOLE SIZE IN PISTON NOSE

(71) Applicant: BorgWarner Inc., Auburn Hills, MI (US)

(72) Inventors: Paul Freemantle, Lansing, NY (US); Keith B. Cobb, Cortland, NY (US); Glenn E. Swanson, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 194 days.

(21) Appl. No.: 15/846,435

(22) Filed: Dec. 19, 2017

(65) Prior Publication Data

US 2018/0172116 A1  Jun. 21, 2018

Related U.S. Application Data

(60) Provisional application No. 62/436,546, filed on Dec. 20, 2016.

(51) Int. Cl.
*F16H 7/08* (2006.01)
*F16K 15/02* (2006.01)
*F02B 67/06* (2006.01)
*F16K 15/04* (2006.01)

(52) U.S. Cl.
CPC .......... *F16H 7/0829* (2013.01); *F02B 67/06* (2013.01); *F16H 7/0848* (2013.01); *F16K 15/02* (2013.01); *F16K 15/044* (2013.01); *F16H 2007/084* (2013.01); *F16H 2007/0814* (2013.01); *F16H 2007/0859* (2013.01)

(58) Field of Classification Search
CPC ..... F16H 2007/0806; F16H 2007/0812; F16H 7/0848; F16H 2007/0859; F16H 7/08
USPC ........................................................ 474/110
See application file for complete search history.

(56) References Cited

U.S. PATENT DOCUMENTS

| 3,626,776 | A | * | 12/1971 | Staudinger et al. | .. F16H 7/0848 474/111 |
| 4,772,251 | A | * | 9/1988 | Goppelt | .... F16H 7/08 474/101 |
| 4,850,941 | A | * | 7/1989 | Sosson | ..... F16H 7/08 474/110 |
| 5,248,282 | A | * | 9/1993 | Suzuki | ..... F16H 7/08 474/110 |
| 5,346,436 | A | * | 9/1994 | Hunter | .. F16H 7/0848 474/110 |
| 5,595,549 | A | * | 1/1997 | Jarrand | .. F16H 7/0848 474/110 |
| 5,707,309 | A | | 1/1998 | Simpson | |

(Continued)

FOREIGN PATENT DOCUMENTS

| CN | 102022493 A | 4/2011 |
| CN | 104455252 A | 3/2015 |

(Continued)

*Primary Examiner* — Henry Y Liu
(74) *Attorney, Agent, or Firm* — Brown & Michaels, PC

(57) ABSTRACT

A tensioner moves the flow restriction controlling the tensioner tuning to the nose of the piston through a hole ranging in cross sectional area from 0.01 mm² to 1.1 mm². It also eliminates a component from the design of the tensioner. The piston hole geometry is one or a plurality of holes.

15 Claims, 9 Drawing Sheets

(56) References Cited

U.S. PATENT DOCUMENTS

| | | | |
|---|---|---|---|
| 5,718,650 A * | 2/1998 | Smith | F16H 7/0848 |
| | | | 474/110 |
| 5,860,881 A | 1/1999 | Tada | |
| 5,879,256 A * | 3/1999 | Tada | F16H 7/08 |
| | | | 474/110 |
| 5,885,179 A * | 3/1999 | Lewis | F16H 7/08 |
| | | | 474/110 |
| 5,908,363 A | 6/1999 | Suzuki | |
| 5,935,031 A | 8/1999 | Tada | |
| 5,967,921 A * | 10/1999 | Simpson | F16H 7/08 |
| | | | 474/110 |
| 6,139,454 A * | 10/2000 | Simpson | F16H 7/0848 |
| | | | 474/109 |
| 6,196,939 B1 * | 3/2001 | Simpson | F16H 7/0848 |
| | | | 474/101 |
| 6,322,468 B1 * | 11/2001 | Wing | F16H 7/08 |
| | | | 474/109 |
| 6,383,103 B1 | 5/2002 | Fujimoto et al. | |
| 6,435,993 B1 * | 8/2002 | Tada | F16H 7/0836 |
| | | | 474/109 |
| 7,691,017 B2 * | 4/2010 | Seungpyo | F16H 7/0836 |
| | | | 267/155 |
| 8,403,481 B2 | 3/2013 | Perissinotto | |
| 8,512,184 B2 * | 8/2013 | Perissinotto | F16H 7/0848 |
| | | | 474/135 |
| 8,727,922 B2 * | 5/2014 | Perissinotto | F16H 7/0836 |
| | | | 474/110 |
| 8,814,734 B2 | 8/2014 | Perissinotto et al. | |
| 8,888,624 B2 | 11/2014 | Bauer et al. | |
| 8,974,333 B2 * | 3/2015 | Bauer | F16H 7/0836 |
| | | | 474/110 |
| 9,080,643 B2 * | 7/2015 | Perissinotto | F16H 7/0836 |
| 9,482,322 B2 | 11/2016 | Weikert et al. | |
| 9,534,661 B2 | 1/2017 | Belmer et al. | |
| 9,605,733 B2 | 3/2017 | Geibel et al. | |
| 9,677,647 B2 | 6/2017 | Geibel et al. | |
| 9,689,475 B2 | 6/2017 | Geibel et al. | |
| 9,714,693 B2 | 7/2017 | Lindner et al. | |
| 9,835,232 B2 | 12/2017 | Geibel et al. | |
| 2003/0139235 A1 * | 7/2003 | Yamamoto | F16H 7/0836 |
| | | | 474/109 |
| 2004/0138018 A1 * | 7/2004 | Hayakawa | F16H 7/0836 |
| | | | 474/122 |
| 2006/0094549 A1 * | 5/2006 | Yoshida | F16H 7/0836 |
| | | | 474/110 |
| 2006/0270500 A1 * | 11/2006 | Yamamoto | F16H 7/0836 |
| | | | 474/109 |
| 2007/0054767 A1 * | 3/2007 | Yamada | F16H 7/0848 |
| | | | 474/109 |
| 2007/0213152 A1 * | 9/2007 | Yamamoto | F16H 7/0848 |
| | | | 474/109 |
| 2007/0249444 A1 * | 10/2007 | Yoshida | F16H 7/0836 |
| | | | 474/110 |
| 2009/0197720 A1 * | 8/2009 | Aurhammer | F16H 7/08 |
| | | | 474/110 |
| 2012/0040790 A1 * | 2/2012 | Perissinotto | F16H 7/0836 |
| | | | 474/110 |
| 2013/0190117 A1 * | 7/2013 | Bauer | F16H 7/08 |
| | | | 474/111 |
| 2013/0337954 A1 * | 12/2013 | Bauer | F16H 7/0836 |
| | | | 474/110 |
| 2016/0102737 A1 | 4/2016 | Geibel et al. | |
| 2016/0348755 A1 | 12/2016 | Ritz et al. | |
| 2016/0356365 A1 * | 12/2016 | Crump | F16H 7/0848 |
| 2017/0009849 A1 | 1/2017 | Stiglmaier et al. | |
| 2017/0089431 A1 | 3/2017 | Stiglmaier | |
| 2017/0146099 A1 * | 5/2017 | Watanabe | F16H 7/08 |
| 2017/0211663 A1 * | 7/2017 | Furukawa | F16H 7/0836 |
| 2017/0276216 A1 | 9/2017 | Perissinotto et al. | |
| 2017/0356529 A1 * | 12/2017 | Simmons | F16H 7/0848 |
| 2018/0172116 A1 * | 6/2018 | Freemantle | F16H 7/0829 |
| 2018/0180191 A1 * | 6/2018 | Shinoyanna | F16H 7/08 |
| 2019/0195123 A1 * | 6/2019 | Iwasaki | F02B 67/06 |

FOREIGN PATENT DOCUMENTS

| | | |
|---|---|---|
| CN | 104455253 A | 3/2015 |
| DE | 202009003615 U1 | 7/2010 |
| DE | 102013219073 A1 | 3/2015 |
| DE | 102013219074 A1 | 3/2015 |
| DE | 102015200605 B3 | 1/2016 |
| DE | 102015009425 A1 | 7/2016 |
| EP | 0317164 A1 | 5/1989 |
| EP | 2423536 A1 | 2/2012 |
| EP | 2824364 A1 | 1/2015 |
| EP | 3130821 A1 | 2/2017 |
| WO | 2016050345 A1 | 4/2016 |

* cited by examiner

PRIOR ART

CONTROL OF HYDRAULIC TENSIONER TUNING USING HOLE SIZE IN PISTON NOSE

CROSS-REFERENCE TO RELATED APPLICATIONS

This application claims the benefit of U.S. Patent Application No. 62/436,546 filed on Dec. 20, 2016, the disclosure of which is herein incorporated by reference in its entirety.

BACKGROUND

Field of the Invention

The invention pertains to the field of hydraulic tensioners. More particularly, the invention pertains to controlling flow rate of oil in hydraulic tensioners.

Description of Related Art

Current hydraulic tensioners utilize a plastic disk seal with a spiral tortuous path to control the amount of flow rate of oil from a high pressure chamber of the hydraulic tensioner to atmosphere. The plastic seal and tortuous path vent through an oversized hole in the nose of the piston.

Inside the piston is a compression spring which pushes on a vent disk that seals to the inside of the piston nose. The seal contains the tortuous path that restricts the flow of oil to allow air venting, but also control the tuning of the tensioner through maintaining oil pressure inside the body. After this flow restriction, oil escapes through an oversized hole in the nose of the piston.

FIGS. 1A and 1B show a tensioner piston 2 with a vent disk 10. The piston 2 includes a piston housing 4 and a hydraulic pressure chamber 6. The piston spring and the tensioner body have been removed for clarity. A tortuous path 12 in the vent disk 10 controls oil flow rate, air venting and tensioner tuning. Once the oil has flowed through the vent disk 10, it escapes the tensioner through an oversized hole 16, typically 2 mm in diameter, in the piston nose 18.

SUMMARY

A tensioner moves the flow restriction controlling the tensioner tuning to the nose of the piston through at least one hole ranging in cross sectional area from 0.01 mm$^2$ to 1.1 mm$^2$. The vent disk is eliminated from the design of the tensioner. The piston hole may be comprised of a single hole or a plurality of holes.

In one embodiment, a piston for a hydraulic tensioner includes a hollow piston including a piston body having a piston nose with at least one axial hole having a diameter and a cross-sectional area. The diameter of the at least one hole is less than 1 mm and the total cross-sectional area of the at least one hole is between 0.01 mm$^2$ and 1.1 mm$^2$.

In another embodiment, a hydraulic tensioner includes a tensioner body having a bore in fluid communication with a source of pressurized fluid through an inlet and a hollow piston slidably received within the bore. The piston includes a piston body having a piston nose with at least one axial hole in the piston nose, where a diameter of the axial hole is less than 1 mm and the total cross-sectional area of the axial hole is between 0.01 mm$^2$ and 1.1 mm$^2$. The tensioner also includes a hydraulic pressure chamber defined by the hollow piston and the bore of the tensioner body, and a piston spring received within the hydraulic pressure chamber for biasing the piston away from the inlet.

In another embodiment, a hollow piston for a hydraulic tensioner includes a piston body having a piston nose comprising at least one axial hole in the piston nose or a radial hole in the piston body. A diameter of the axial hole or the radial hole is less than 1 mm and a total cross-sectional area of the axial hole or the radial hole is between 0.01 mm$^2$ to 1.1 mm$^2$.

In yet another embodiment, a piston for a hydraulic tensioner includes a hollow piston comprising a piston body having a piston nose with at least two axial holes having a cross-sectional area. The total cross-sectional area of the at least two holes is between 0.01 mm$^2$ to 1.1 mm$^2$.

In another embodiment, a hydraulic tensioner includes a tensioner body having a bore in fluid communication with a source of pressurized fluid through an inlet and a hollow piston slidably received within the bore. The piston includes a piston body having a piston nose with at least two axial holes in the piston nose, where a total cross-sectional area of the at least two axial holes is between 0.01 mm$^2$ to 1.1 mm$^2$. The tensioner also includes a hydraulic pressure chamber defined by the hollow piston and the bore of the tensioner body and a piston spring received within the hydraulic pressure chamber for biasing the piston away from the inlet.

In another embodiment, a piston for a hydraulic tensioner includes a hollow piston comprising a piston body having a piston nose with an axial hole having a diameter of less than 1 mm.

In yet another embodiment, a hydraulic tensioner includes a tensioner body having a bore in fluid communication with a source of pressurized fluid through an inlet and a hollow piston slidably received within the bore. The piston includes a piston body having a piston nose with an axial hole having a diameter of less than 1 mm. The tensioner also includes a hydraulic pressure chamber defined by the hollow piston and the bore of the tensioner body and a piston spring received within the hydraulic pressure chamber for biasing the piston away from the inlet.

DETAILED DESCRIPTION

Figure 1A:
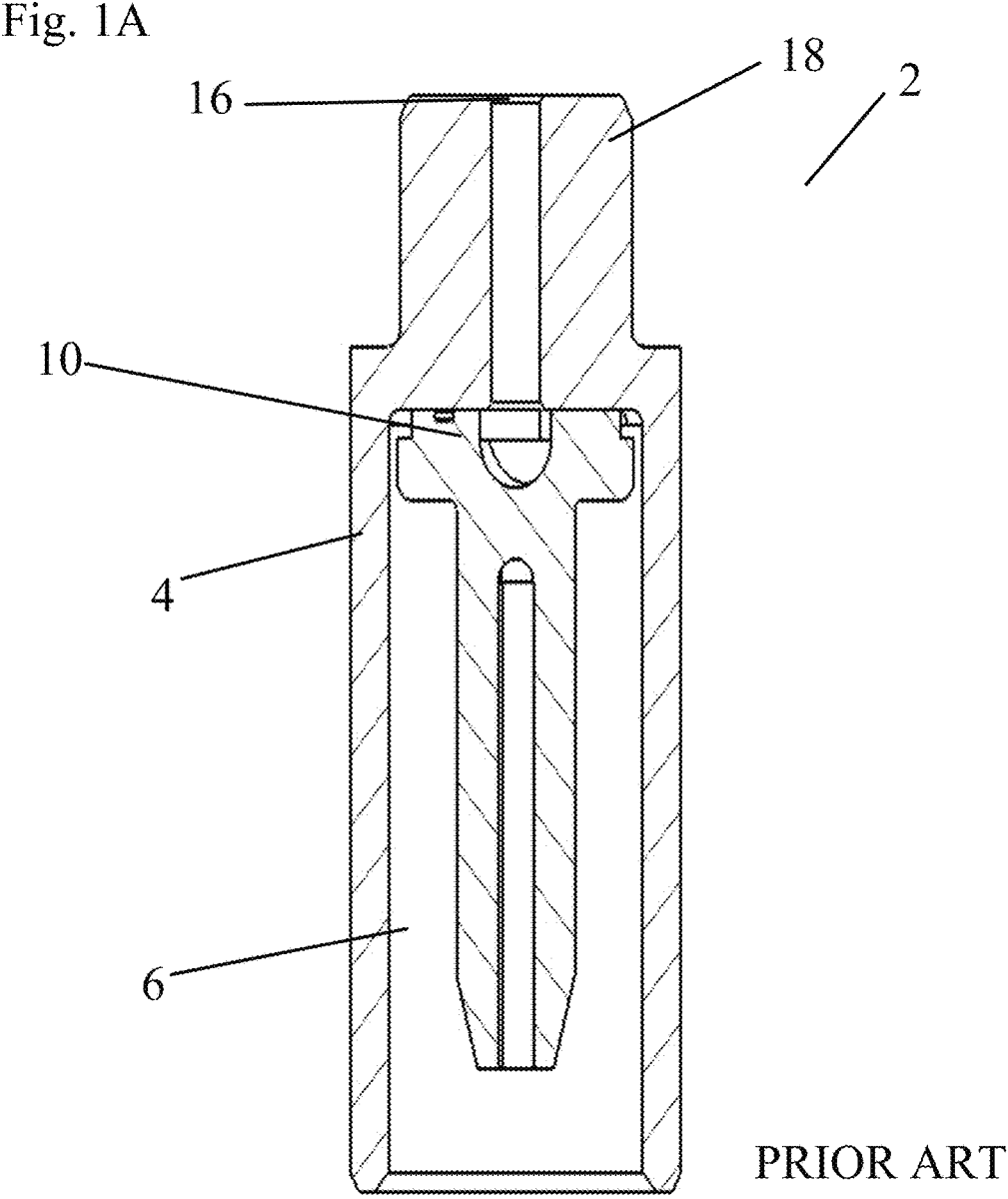
FIG. 1A shows a prior art tensioner piston with a vent disk.
Figure 1B:
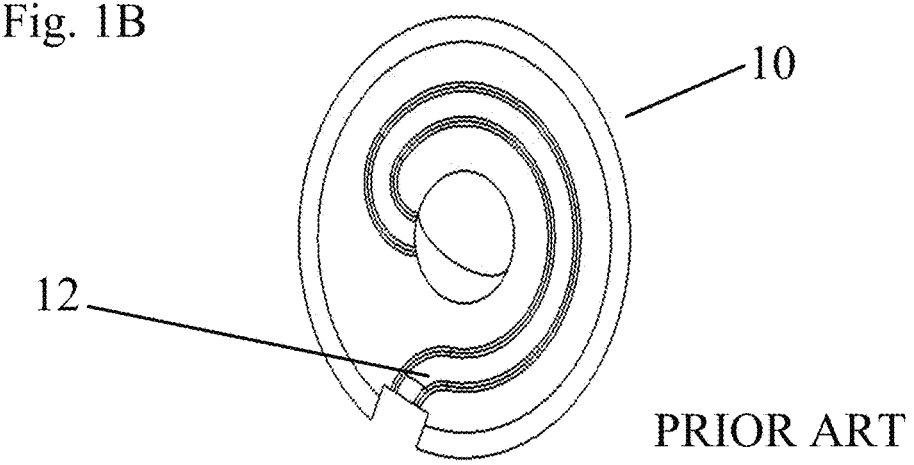
FIG. 1B shows a close up view of a prior art vent disk.

A tensioner moves the flow restriction controlling the tensioner tuning to the nose of the piston through a hole ranging in cross sectional area from 0.01 mm² to 1.1 mm². The piston hole geometry is comprised of a single hole or a plurality of holes. In some embodiments with a single axial hole, the hole has a diameter of less than 1 mm. The hole(s) in the piston nose allow the removal of a component in the assembly reducing cost and complexity. The hole(s) also allow for air venting to allow full tensioner control and control of the flow rate of oil for tensioner tuning. Any trapped air in the tensioner is evacuated through the small holes in the nose of the piston. Oil pressure in the high pressure chamber of the piston moves through the holes to control the amount of damping on the tensioner and hence chain load in the engine.

Control of hydraulic tensioner tuning uses a specific hole cross sectional area, preferably in the piston nose, to control oil flow rate. The holes are preferably axially located within the piston nose. Axial holes in the piston nose provide oil to lubricate the chain. The holes may alternatively be located in the side of the piston. Radial holes on the side of the piston may reduce friction between the piston and bore by squirting oil directly into the tensioner bore. In some embodiments, the piston includes both axial holes and radial holes to lubricate the chain and reduce friction. The desired cross-sectional area may be accomplished using a single hole, or more than one hole. For example, there may be two holes, three holes, four holes, five holes, or more than five holes, depending on the available space in the piston nose or body, as well as the flow rate and total cross-sectional area desired.

Replacing the vent disks with holes reduces the cost of manufacturing and assembling the tensioner, due to part elimination and a reduction in complexity.

The tensioner pistons described herein eliminate the plastic disk and instead use a singular hole or orifice or a plurality of holes or orifices placed directly in the piston nose (and/or in the piston body) that instead of simply providing a means of oil escape, control the flow of oil from the high pressure chamber to atmosphere.

The hole(s) have a specific total cross sectional area that corresponds to a desired flow rate of oil at a certain pressure. This flow rate controls tensioner tuning.

In alternative embodiments, oil flow could be out of one or more holes in the side of the piston instead of the nose. The orifices could be in the tensioner body instead of the piston to allow air to escape and control flow. The number of holes could be changed to control oil flow within the bounds of the cross-sectional area.

In preferred embodiments, a laser may be used to create holes of a desired size.

In some embodiments, a single hole size is chosen, and the number of holes vary depending on the flow rate needed for a particular tensioner. In some embodiments, each of the holes has a diameter between approximately 0.1 mm and 1.0 mm. In other embodiments, each of the holes has a diameter between approximately 0.1 mm and 0.5 mm. In still other embodiments, each hole is less than approximately 0.5 mm in diameter. In some preferred embodiments, a total cross-sectional area of all of the holes is between approximately 0.01 mm2 and 1.1 mm2.

Figure 2:
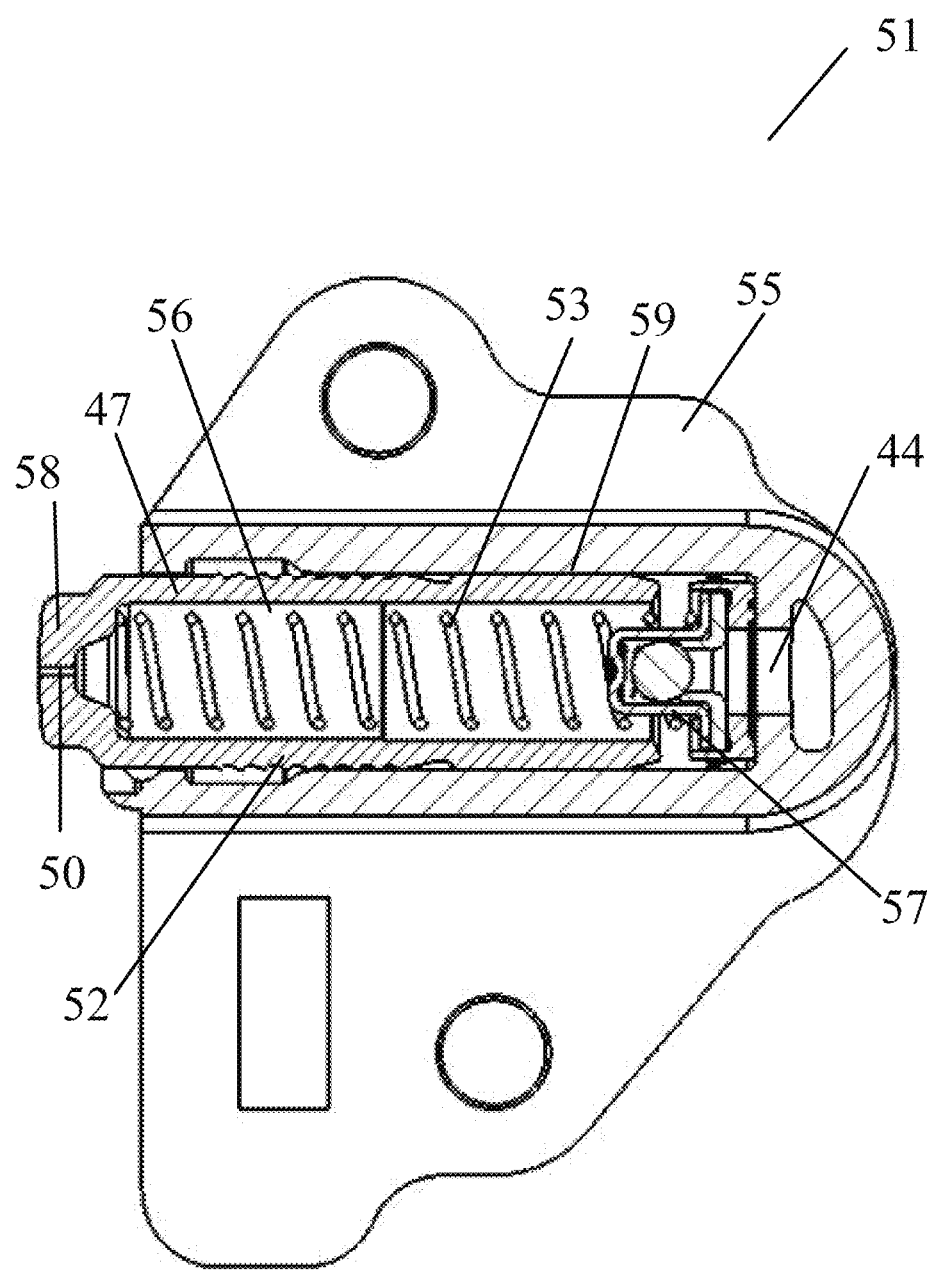
FIG. 2 shows a tensioner with an axial hole to tune the tensioner in an embodiment of the present invention.

Referring to FIG. 2, a tensioner body 55 of the tensioner 51 defines a cylindrical bore 59 for slidably receiving a hollow piston 52. One end of the bore 59 contains an inlet 44 in fluid communication with an external supply of pressurized fluid (not shown) and a check valve assembly 57 (ball, retainer, spring, and seat). A high pressure chamber 56 is defined by an inner circumference of the hollow piston 52, bore 59, a compression spring 53 and the check valve assembly 57. The compression spring 53 biases the piston 52 away from the inlet 44. The piston 52 has a body 47 with a nose portion 58 with a single axial hole 50 connecting atmosphere to the high pressure chamber 56. While only a single axial hole 50 is shown in the tensioner of FIG. 2, any number of axial holes and/or radial holes may be located in the tensioner 51, as described below with respect to FIGS. 3-7.

Figure 3:
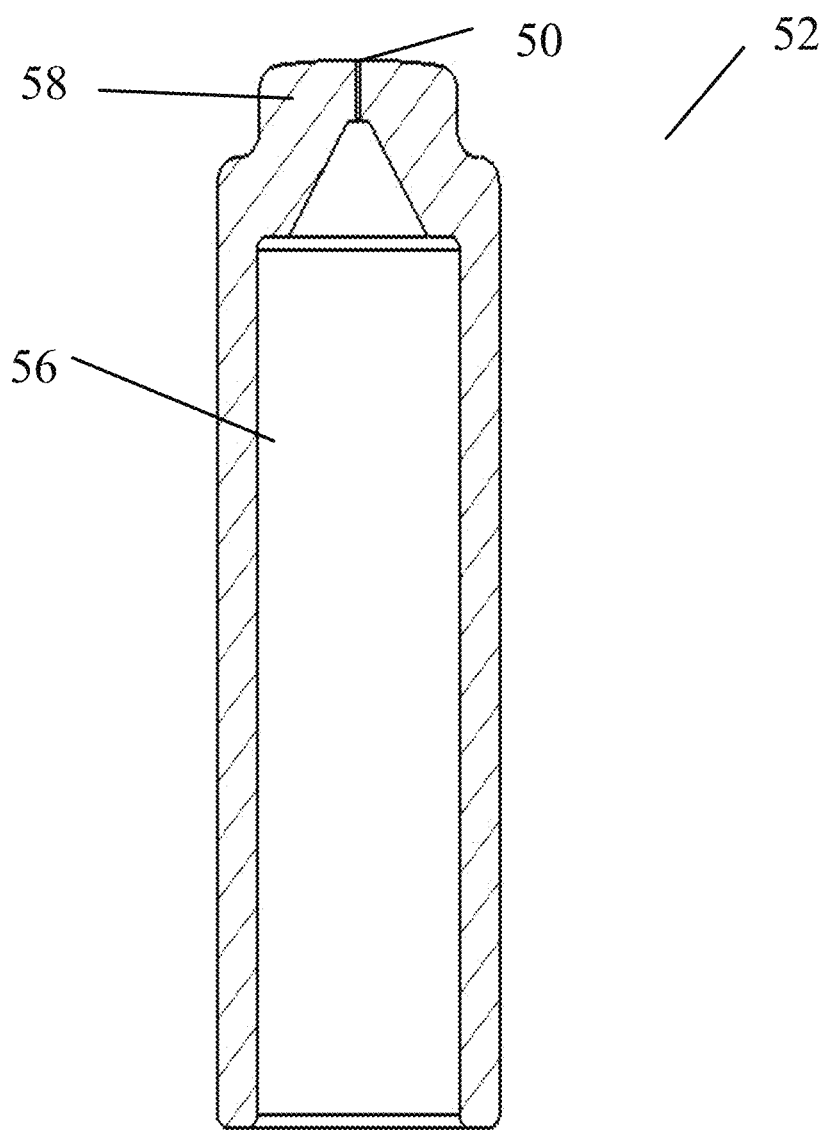
FIG. 3 shows a tensioner piston with a single axial hole in an embodiment of the present invention.

FIG. 3 shows a piston 52 with one hole 50 in a nose 58 of the piston 52. In preferred embodiments, the hole 50 has a cross sectional area ranging from 0.01 mm² to 1.1 mm². In some preferred embodiments, the hole 50 has a diameter less than 1 mm. In some embodiments, each of the holes has a diameter between approximately 0.1 mm and 1.0 mm. In other embodiments, the hole has a diameter between 0.1 mm and 0.5 mm. The hole 50 allows for air venting to allow full tensioner control and control the flow rate of oil for tensioner tuning. Any trapped air in the tensioner 51 is evacuated to atmosphere through the hole in the nose 58 of the piston 52. Oil pressure in the high pressure chamber 56 moves through the hole 50 to control the amount of damping on the tensioner 51 and hence chain load in the engine.

Figure 4:
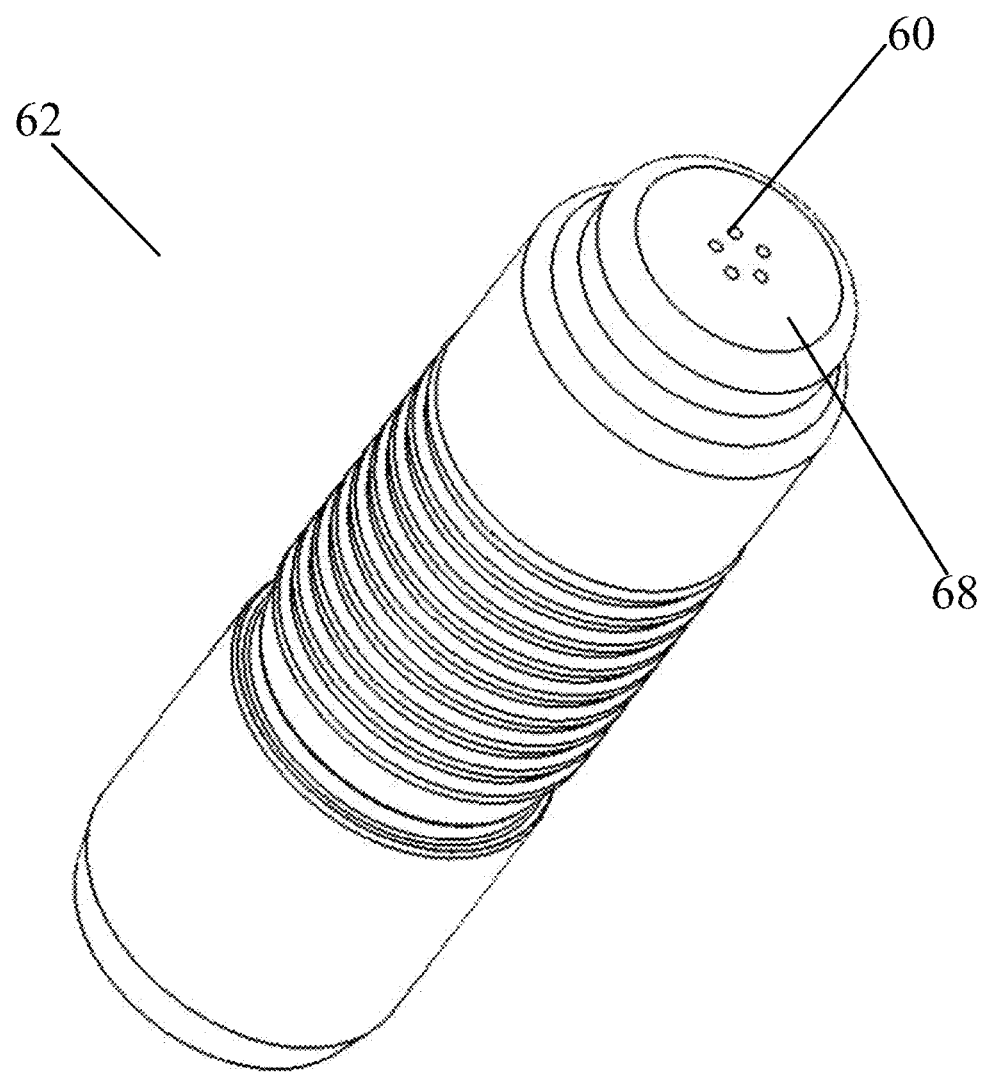
FIG. 4 shows a tensioner piston with multiple axial holes to tune the tensioner in another embodiment of the present invention.

The desired cross-sectional area for venting/tuning may alternatively be accomplished using more than one hole. FIG. 4 shows a piston 62 with five holes 60 in the nose 68 of the piston 62, which would replace piston 52 of FIG. 2. In preferred embodiments, the total cross sectional area of the five holes 60 ranges from 0.01 mm² to 1.1 mm². In some embodiments, each of the holes has a diameter between approximately 0.1 mm and 1.0 mm. In other embodiments, each of the holes has a diameter between approximately 0.1 mm and 0.5 mm. All of the holes 60 may be the same size, or one or more of the holes may have different sizes, as long as the total cross-sectional area is satisfied. The holes 60 allow for air venting to allow full tensioner control and control the flow rate of oil for tensioner tuning. Any trapped air in the tensioner is evacuated through the holes in the nose 68 of the piston 62. Oil pressure in the high pressure chamber moves through the holes 60 to control the amount of damping on the tensioner and hence chain load in the engine. While there are five holes 60 in FIG. 4, there may alternatively be two holes, three holes, four holes, or more than five holes, depending on the available space in the piston nose, as well as the flow rate and total cross-sectional area desired. Each hole 60 may be the same size, or different sizes, as long as the desired total cross sectional area of all of the holes is met.

Figure 5:
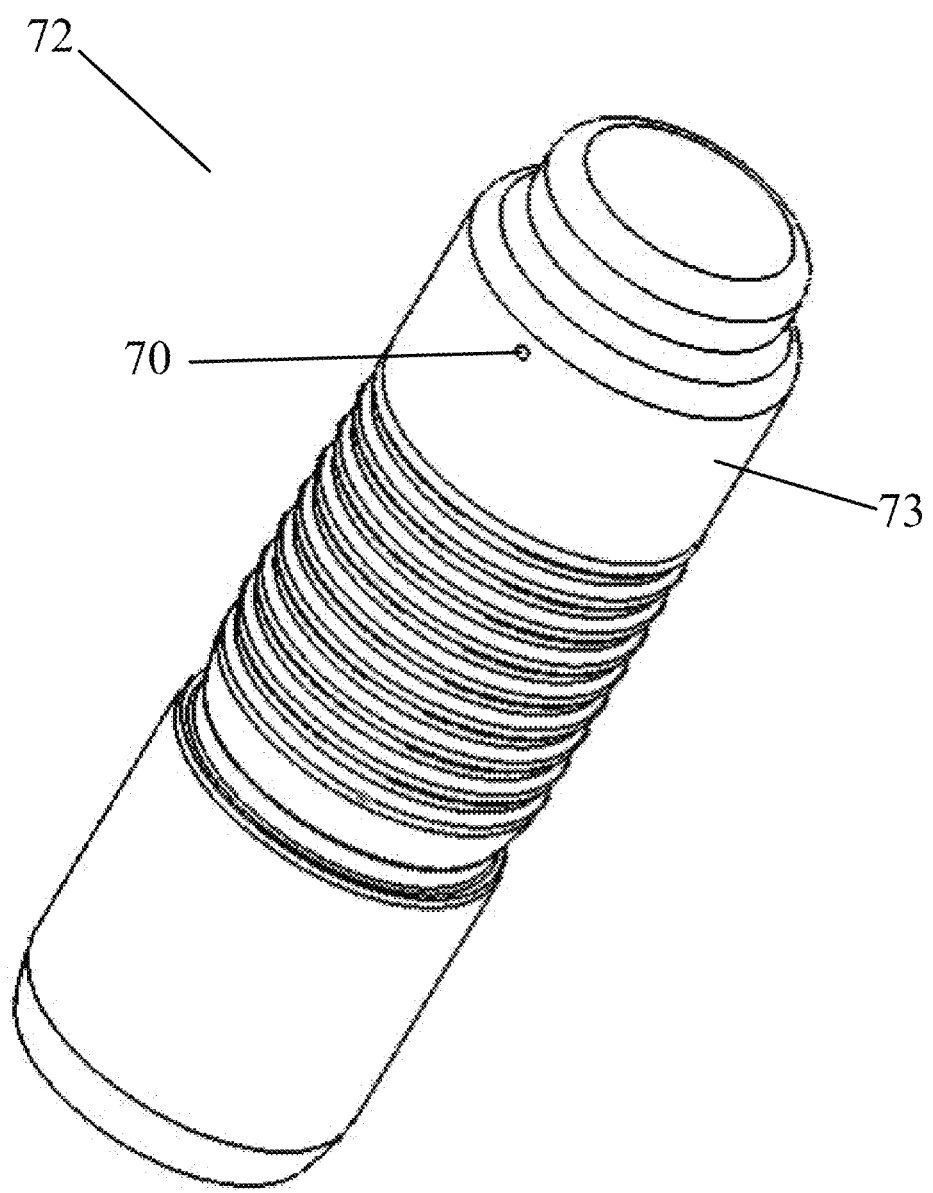
FIG. 5 shows a tensioner piston with a hole in the piston body to tune the tensioner in another embodiment of the present invention.

The holes may alternatively be located on the side of the body of the piston. FIG. 5 shows a piston 72 with one hole 70 on the body 73 of the piston 72, which would replace piston 52 of FIG. 2. In preferred embodiments, the cross sectional area of the hole 70 ranges from 0.01 mm² to 1.1 mm². In some embodiments, each of the holes has a diameter between approximately 0.1 mm and 1.0 mm. In other embodiments, each of the holes has a diameter between approximately 0.1 mm and 0.5 mm. The hole 70 allows for air venting to allow full tensioner control and control the flow rate of oil for tensioner tuning. Any trapped air in the tensioner is evacuated through the hole in the body 73 of the piston 72. Oil pressure in the high pressure chamber moves through the hole 70 to control the amount of damping on the tensioner and hence chain load in the engine.

Figure 6:
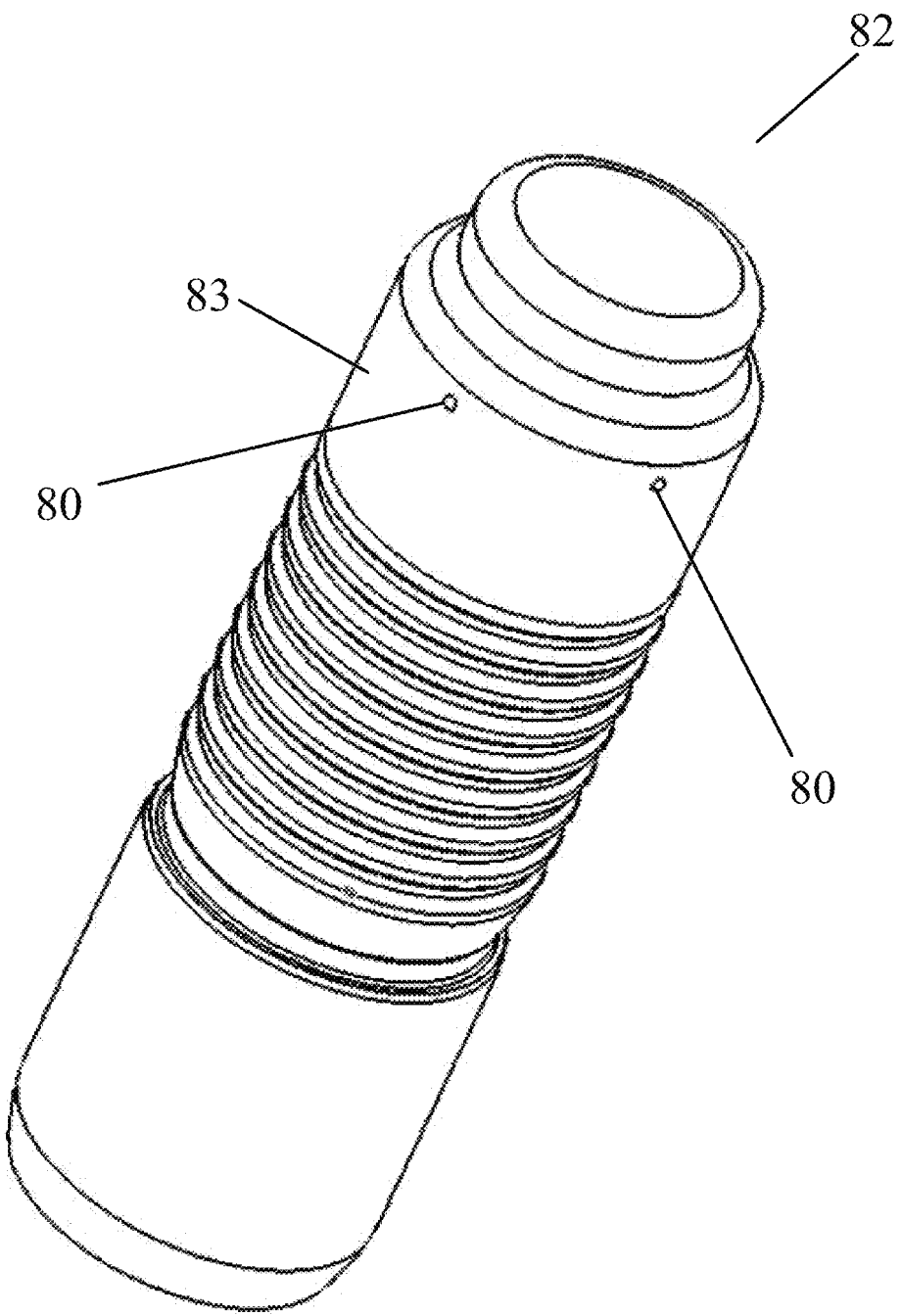
FIG. 6 shows a tensioner piston with multiple holes in the piston body to tune the tensioner in another embodiment of the present invention.

Multiple holes 80 may alternatively be located in the side of body 83 of the piston 82 as shown in FIG. 6. In some embodiments with multiple radial holes 80, the holes are spaced evenly to balance the forces on the piston. The piston 82 would replace piston 52 of the tensioner of FIG. 2. In preferred embodiments, the total cross sectional area of the holes 80 ranges from 0.01 mm² to 1.1 mm². In some embodiments, each of the holes has a diameter between approximately 0.1 mm and 1.0 mm. In other embodiments, each of the holes has a diameter between approximately 0.1 mm and 0.5 mm. The holes 80 allow for air venting to allow full tensioner control and control the flow rate of oil for tensioner tuning. Any trapped air in the tensioner is evacuated through the holes 80 in the body 83 of the piston 82. Oil pressure in the high pressure chamber moves through the holes 80 to control the amount of damping on the tensioner and hence chain load in the engine. While there are two holes 80 in FIG. 6, there may alternatively be three holes, four holes, five holes, or more than five holes in various locations along the body 83 of the piston 82, depending on the available space in the piston body, as well as the flow rate and total cross-sectional area desired. Each hole 80 may be the same size, or different sizes, as long as the desired total cross sectional area of all of the holes is met.

Figure 7:
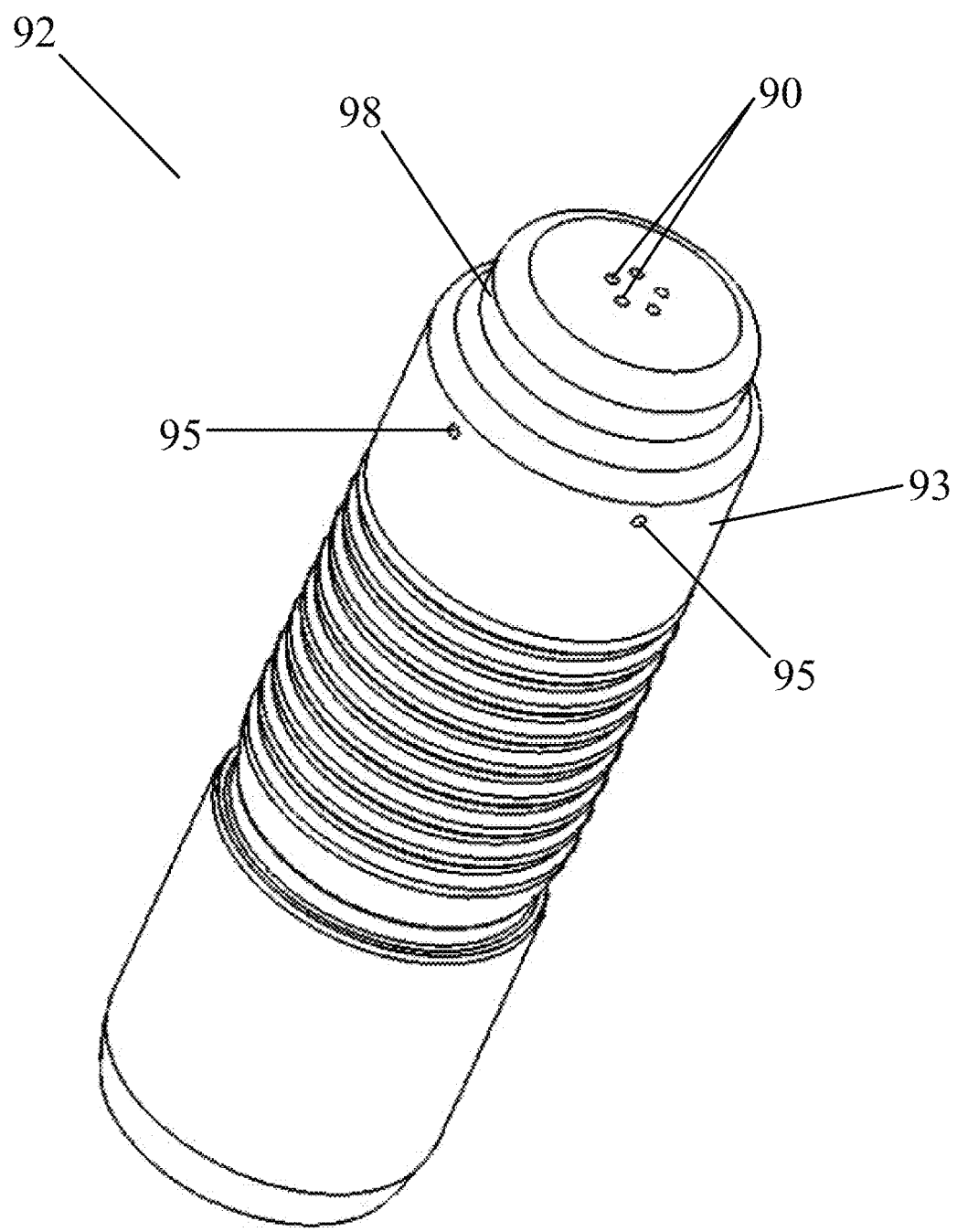
FIG. 7 shows a tensioner piston with both radial holes in the piston body and axial holes in the piston nose to tune the tensioner in another embodiment.

FIG. 7 shows another embodiment with a piston 92 that has at least one hole 90 in the nose 98 of the piston 92 and at least one hole 95 in the body 93 of the piston 92. Piston 92 would replace piston 52 of FIG. 2. In preferred embodiments, the total cross-sectional area of all of the holes 90, 95 ranges from 0.01 mm² to 1.1 mm². In some embodiments, each of the holes has a diameter between approximately 0.1 mm and 1.0 mm. In other embodiments, each of the holes has a diameter between approximately 0.1 mm and 0.5 mm. The holes 90, 95 allow for air venting to allow full tensioner control and control the flow rate of oil for tensioner tuning. Any trapped air in the tensioner is evacuated through the hole 90 in the nose 98 of the piston 92 and the hole 95 in the body 93 of the piston 92. Oil pressure in the high pressure chamber moves through the hole 90, 95 to control the amount of damping on the tensioner and hence chain load in the engine. While there are five axial holes 90 and two radial holes 95 in FIG. 7, there may alternatively be two holes, three holes, four holes, or more than five axial holes 90 and three holes, four holes, five holes, or more than five radial holes 95 in various locations along either the nose 98 of the piston 92 and/or the body 93 of the piston, depending on the available space in the piston nose and body, as well as the flow rate and total cross-sectional area desired. Each hole may be the same size, or different sizes, as long as the desired total cross sectional area of all of the holes is met.

To determine hole diameter and number of holes based on flow rate, one can use the following equation, where d=hole diameter (mm), n=number of holes and F=flow rate (cc/sec).

$$d = 2\sqrt{\left(\frac{F}{72.442n\pi}\right)}$$

Some preferred diameters for single axial holes at 700 psi based on flow rate, as calculated using the equation above, are shown in Table 1.

TABLE 1

| Required Flow Rate (cc/s) | Number of Holes | Diameter of hole (mm) |
| --- | --- | --- |
| 0.75 | 1 | 0.115 |
| 1 | 1 | 0.133 |
| 1.75 | 1 | 0.175 |
| 7 | 1 | 0.351 |
| 9.5 | 1 | 0.409 |
| 12 | 1 | 0.459 |
| 12 | 1 | 0.459 |
| 14 | 1 | 0.496 |
| 16 | 1 | 0.530 |
| 16 | 1 | 0.530 |
| 19 | 1 | 0.578 |
| 22 | 1 | 0.622 |
| 22 | 1 | 0.622 |
| 26 | 1 | 0.676 |
| 30 | 1 | 0.726 |
| 28.4 | 1 | 0.707 |
| 33.65 | 1 | 0.769 |
| 38.9 | 1 | 0.827 |
| 44 | 1 | 0.879 |
| 52 | 1 | 0.956 |
| 60 | 1 | 1.027 |
| 51 | 1 | 0.947 |
| 60 | 1 | 1.027 |
| 69 | 1 | 1.101 |
| 70 | 1 | 1.109 |
| 80 | 1 | 1.186 |
| 90 | 1 | 1.258 |

Table 2 shows actual data for different numbers of holes and different diameter holes.

TABLE 2

| # Of Holes | Nom Hole Diam (mm) | Hole 1 Diam (mm) | Hole 2 Diam (mm) | Hole 3 Diam (mm) | Hole 4 Diam (mm) | Hole 5 Diam (mm) | Avg Hole Diam (mm) | Total Area (mm²) | Equivalent single Hole Diam (mm) | Flow @ 700 psi (cc/s) |
| --- | --- | --- | --- | --- | --- | --- | --- | --- | --- | --- |
| 1 | 0.1 | 0.0745 | | | | | 0.0745 | 0.0044 | 0.0745 | 0.19 |
| 1 | 0.2 | 0.1635 | | | | | 0.1635 | 0.0210 | 0.1635 | 1.79 |
| 1 | 0.3 | 0.2444 | | | | | 0.2444 | 0.0469 | 0.2444 | 3.86 |
| 1 | 0.4 | 0.389 | | | | | 0.3890 | 0.1188 | 0.3890 | 8.93 |
| 1 | 0.5 | 0.4989 | | | | | 0.4989 | 0.1955 | 0.4989 | 14.02 |
| 2 | 0.1 | 0.0794 | 0.0873 | | | | 0.0834 | 0.0109 | 0.1180 | 0.88 |
| 2 | 0.2 | 0.1733 | 0.1748 | | | | 0.1741 | 0.0476 | 0.2461 | 4.18 |
| 2 | 0.3 | 0.2655 | 0.2695 | | | | 0.2675 | 0.1124 | 0.3783 | 8.56 |
| 2 | 0.4 | 0.3962 | 0.4029 | | | | 0.3996 | 0.2508 | 0.5651 | 18.25 |
| 2 | 0.5 | 0.4923 | 0.5064 | | | | 0.4994 | 0.3918 | 0.7063 | 28.66 |
| 3 | 0.1 | 0.0923 | 0.0786 | 0.0908 | | | 0.0872 | 0.0180 | 0.1515 | 1.35 |
| 3 | 0.2 | 0.1713 | 0.1754 | 0.1685 | | | 0.1717 | 0.0695 | 0.2975 | 5.91 |
| 3 | 0.3 | 0.2692 | 0.2677 | 0.2714 | | | 0.2694 | 0.1711 | 0.4667 | 12.8 |
| 3 | 0.4 | 0.4001 | 0.3986 | 0.3869 | | | 0.3952 | 0.3681 | 0.6846 | 26.89 |
| 3 | 0.5 | 0.5149 | 0.5054 | 0.514 | | | 0.5114 | 0.6163 | 0.8859 | 43.9 |
| 4 | 0.1 | 0.0895 | 0.0781 | 0.0801 | 0.0836 | | 0.0828 | 0.0216 | 0.1659 | 1.67 |
| 4 | 0.2 | 0.1858 | 0.1899 | 0.1838 | 0.1783 | | 0.1845 | 0.1069 | 0.3690 | 7.73 |
| 4 | 0.3 | 0.2308 | 0.2425 | 0.2398 | 0.2387 | | 0.2380 | 0.1779 | 0.4760 | 13.88 |
| 4 | 0.4 | 0.3629 | 0.3627 | 0.3531 | 0.3545 | | 0.3583 | 0.4034 | 0.7167 | 29.62 |

TABLE 2-continued

| # Of Holes | Nom Hole Diam (mm) | Hole 1 Diam (mm) | Hole 2 Diam (mm) | Hole 3 Diam (mm) | Hole 4 Diam (mm) | Hole 5 Diam (mm) | Avg Hole Diam (mm) | Total Area (mm$^2$) | Equivalent single Hole Diam (mm) | Flow @ 700 psi (cc/s) |
|---|---|---|---|---|---|---|---|---|---|---|
| 4 | 0.5 | 0.4747 | 0.4635 | 0.4693 | 0.4443 | | 0.4630 | 0.6737 | 0.9262 | 48.9 |
| 5 | 0.1 | 0.0878 | 0.0865 | 0.0894 | 0.0823 | 0.0894 | 0.0871 | 0.0298 | 0.1948 | 2.15 |
| 5 | 0.2 | 0.1662 | 0.176 | 0.1702 | 0.1712 | 0.175 | 0.1717 | 0.1158 | 0.3841 | 9.6 |
| 5 | 0.3 | 0.2646 | 0.269 | 0.2654 | 0.27 | 0.268 | 0.2674 | 0.2808 | 0.5979 | 21.16 |
| 5 | 0.4 | 0.3812 | 0.3784 | 0.3855 | 0.3795 | 0.3775 | 0.3804 | 0.5683 | 0.8507 | 40.6 |
| 5 | 0.5 | 0.4648 | 0.4523 | 0.4553 | 0.4605 | 0.464 | 0.4594 | 0.8288 | 1.0273 | 59.5 |

Figure 8:
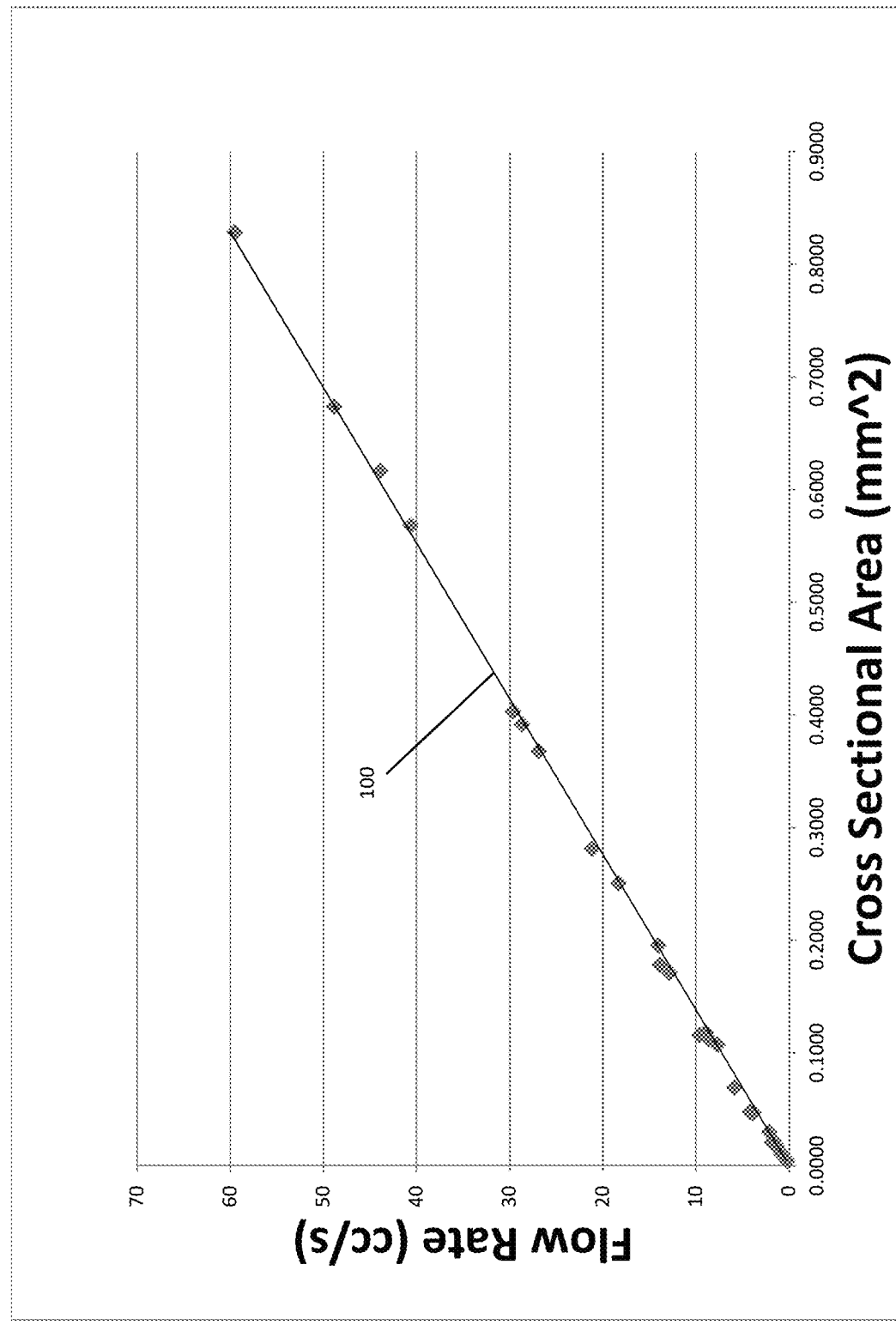
FIG. 8 shows a graph of the relationship between flow rate and cross-sectional area.

As shown in Table 2, the total cross sectional area of the hole(s) drives the flow rate at a given pressure. FIG. 8 shows the linear relationship between the total cross sectional area (mm$^2$) for one to five holes at diameters of 0.1 mm to 0.5 mm and flow rate (cc/s) at 700 psi. For example, one larger hole achieves the same flow as two smaller holes with the same total cross sectional area. As shown in FIG. 8, this relationship is linear 100; as the desired flow rate increases, cross sectional area increases at the same rate. In preferred embodiments, a maximum flow rate required for the tensioner is approximately 1.1 mm$^2$.

Figure 9:
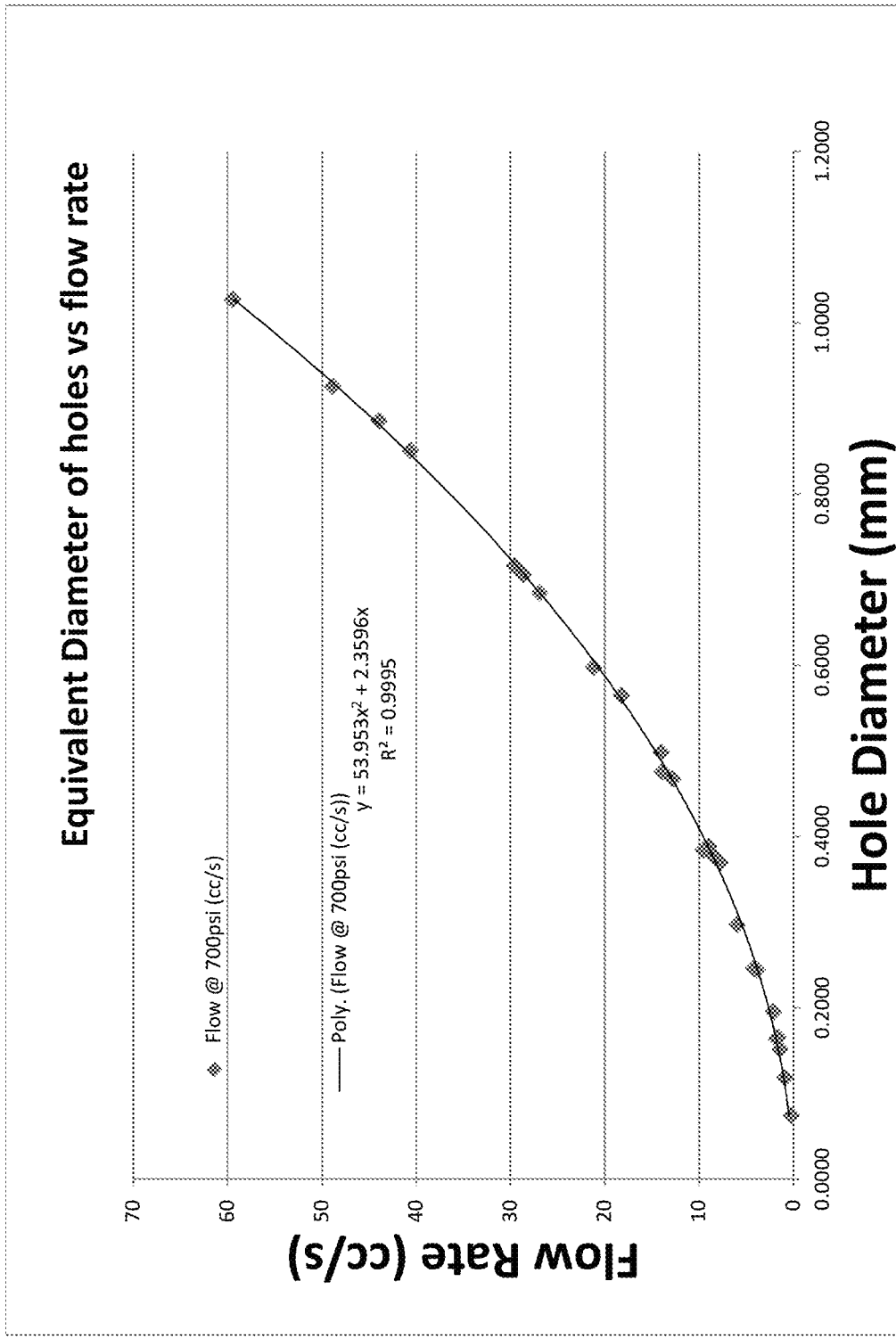
FIG. 9 shows a graph of hole diameter versus flow rate.

The equivalent single hole diameter (mm) versus flow rate (cc/s) at 700 psi of the data in Table 2 is shown in FIG. 9.

One concern with particularly small holes is whether the hole could potentially plug due to contaminated oil. Testing of hole sizes showed that a 0.1 mm diameter sized hole performed only marginally worse than a vent disk that required a 1 cc/s flow rate. The 0.1 mm diameter hole flowed at around 0.2 cc/s at 700 psi. The contaminated range was 30% to 75% of nominal (excluding a piston at 150 um particles and very high flow). An equivalent vent disk flowed at about 0.6 cc/s at 700 psi. The contaminated range was 52% to 135% of nominal (excluding a piston at 15 um particles and very high flow). Since a 0.1 mm diameter hole would flow around 0.2 mm at 700 psi, the preferred minimum hole size is preferably 0.13 mm to allow equivalent flow. This is equal to a cross-sectional area of 0.013 mm$^2$.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A piston for a hydraulic tensioner, comprising:
a hollow piston comprising a piston body having a piston nose with at least three axial holes having a diameter and a cross-sectional area; wherein the total cross-sectional area of the at least three holes one hole is between 0.01 mm$^2$ to 1.1 mm$^2$.

2. The piston of claim 1, wherein the total cross-sectional area of the hole is at least 0.013 mm$^2$.

3. The piston of claim 1, wherein the diameter of each hole is between 0.1 mm and 0.5 mm.

4. The piston of claim 1, wherein the diameter of each hole is between 0.1 mm and 1.0 mm.

5. The piston of claim 1, wherein the piston nose has four axial holes, wherein a total cross-sectional area of the four axial holes is between 0.01 mm$^2$ and 1.1 mm$^2$.

6. The piston of claim 1, wherein the piston nose has five holes, wherein a total cross-sectional area of the five axial holes is between 0.01 mm$^2$ and 1.1 mm$^2$.

7. The piston of claim 1, further comprising at least one radial hole in the piston body, wherein a total cross-sectional area of the at least three axial holes in the piston nose and the radial hole in the piston body is between 0.01 mm$^2$ and 1.1 mm$^2$.

8. The piston of claim 1, wherein the hydraulic tensioner comprises:
a tensioner body having a bore in fluid communication with a source of pressurized fluid through an inlet, the bore receiving the hollow piston;
a hydraulic pressure chamber defined by the hollow piston and the bore of the tensioner body; and
a piston spring received within the hydraulic pressure chamber for biasing the piston away from the inlet.

9. A hollow piston for a hydraulic tensioner, comprising:
a piston body having a piston nose comprising at least a radial hole in the piston body;
wherein a diameter of each radial hole is less than 1 mm and a total cross-sectional area of the radial hole is between 0.01 mm$^2$ to 1.1 mm$^2$.

10. The piston of claim 9, wherein the diameter of the radial hole is between 0.1 mm and 0.5 mm.

11. The piston of claim 9, wherein the diameter of the radial hole is between 0.1 mm and 1.0 mm.

12. A piston for a hydraulic tensioner, comprising:
a hollow piston comprising a piston body having a piston nose with an axial hole having a diameter of less than 1 mm and at least one radial hole in the piston body, wherein a total cross-sectional area of the axial hole in the piston nose and the radial hole in the piston body is between 0.01 mm$^2$ and 1.1 mm$^2$.

13. The piston of claim 12, wherein a total cross-sectional area of the hole is at least 0.013 mm$^2$.

14. The piston of claim 12, wherein the axial hole has a diameter between 0.1 mm and 0.5 mm.

15. The piston of claim 12, wherein the axial hole has a diameter between 0.1 mm and 1.0 mm.

* * * * *

UNITED STATES PATENT AND TRADEMARK OFFICE
CERTIFICATE OF CORRECTION

PATENT NO. : 10,738,861 B2
APPLICATION NO. : 15/846435
DATED : August 11, 2020
INVENTOR(S) : Paul Freemantle et al.

Page 1 of 1

It is certified that error appears in the above-identified patent and that said Letters Patent is hereby corrected as shown below:

In the Claims

Claim 1 (Column 7, Line 52): "sectional area of the at least three holes one hole is" should read "sectional area of the at least three holes is"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*